(12) United States Patent
Mori et al.

(10) Patent No.: US 9,598,065 B2
(45) Date of Patent: Mar. 21, 2017

(54) INTERNAL COMBUSTION ENGINE CONTROLLER, AND CONTROL SYSTEM AND METHOD OF CONTROLLING AN INTERNAL COMBUSTION ENGINE

(71) Applicants: HONDA MOTOR CO., LTD., Tokyo (JP); ZF FRIEDRICHSHAFEN AG, Friedrichshafen (DE)

(72) Inventors: Ryuichi Mori, Dublin, OH (US); Christopher Hopp, Dublin, OH (US); Kazuma Sasahara, Columbus, OH (US); Brian Flora, Springfield, OH (US); Christian Villing, Langenargen (DE)

(73) Assignees: HONDA MOTOR CO., LTD., Tokyo (JP); ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/513,714

(22) Filed: Oct. 14, 2014

(65) Prior Publication Data
US 2016/0101768 A1    Apr. 14, 2016

(51) Int. Cl.
*B60W 10/06* (2006.01)
*B60W 10/10* (2012.01)

(52) U.S. Cl.
CPC ............ *B60W 10/06* (2013.01); *B60W 10/10* (2013.01); *B60W 2510/06* (2013.01); *B60W 2710/10* (2013.01)

(58) Field of Classification Search
None
See application file for complete search history.

(56) References Cited

U.S. PATENT DOCUMENTS

| | | | |
|---|---|---|---|
| 6,938,598 B1 | 9/2005 | Lewis et al. | |
| 7,059,998 B2 | 6/2006 | Bolander et al. | |
| 7,169,080 B2 | 1/2007 | Takagi et al. | |
| 7,347,805 B2 | 3/2008 | Iriyama et al. | |
| 7,438,665 B2 | 10/2008 | Takagi et al. | |
| 8,290,669 B2 | 10/2012 | Ellis | |
| 8,308,609 B2 | 11/2012 | Holland et al. | |
| 8,499,743 B2 | 8/2013 | Tripathi et al. | |
| 8,647,236 B2 | 2/2014 | Koerner | |
| 2009/0118936 A1 | 5/2009 | Heap | |

(Continued)

*Primary Examiner* — Edwin A Young
(74) *Attorney, Agent, or Firm* — Arent Fox LLP

(57) ABSTRACT

An engine controller for controlling an internal combustion engine having a plurality of cylinders is provided. The engine controller is in signal communication with the internal combustion engine, an automatic transmission, and a displacement adjusting mechanism. The engine controller is configured to determine an operating condition of the internal combustion engine and to communicate with the automatic transmission to shift to one of a plurality of gear configurations, and the displacement adjusting mechanism to one of activate and deactivate at least one cylinder. The engine controller determines that a shift from a first gear configuration to a second gear configuration requires a positive torque when the at least one cylinder is deactivated. The engine controller communicates with the displacement adjusting mechanism to activate the at least one deactivated cylinder such that the plurality of cylinders are activated before the shift between gear configurations and the positive torque are completed.

20 Claims, 3 Drawing Sheets

(56) References Cited

U.S. PATENT DOCUMENTS

| | | |
|---|---|---|
| 2010/0012053 A1* | 1/2010 | Surnilla ................. B60W 10/11 123/21 |
| 2011/0184616 A1 | 7/2011 | Holtz |
| 2011/0231071 A1* | 9/2011 | Phillips ................. B60K 6/485 701/54 |
| 2012/0173100 A1 | 7/2012 | Ellis |
| 2012/0221217 A1* | 8/2012 | Sujan .................... B60W 10/06 701/54 |
| 2013/0297160 A1 | 11/2013 | Kar et al. |
| 2014/0142821 A1* | 5/2014 | Heap .................... B60W 10/10 701/54 |

\* cited by examiner

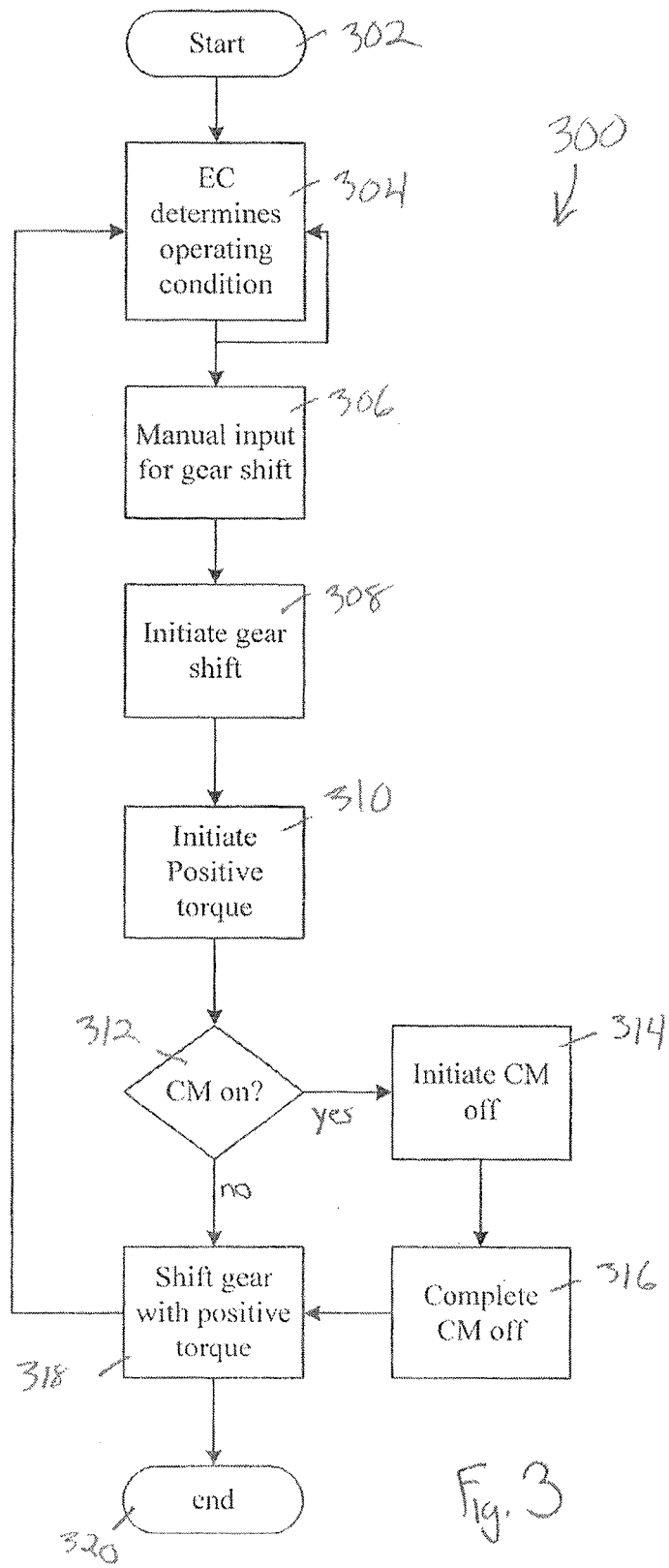

INTERNAL COMBUSTION ENGINE CONTROLLER, AND CONTROL SYSTEM AND METHOD OF CONTROLLING AN INTERNAL COMBUSTION ENGINE

BACKGROUND

The subject matter disclosed herein relates to apparatus and methods for controlling an internal combustion engine and, more particularly, to a control system and methods of controlling a variable displacement internal combustion engine.

Consumers want powerful yet fuel efficient automobiles and trucks. Studies have shown that a significant amount of time, users operate the internal combustion engine in their vehicle in a way that requires a fraction of the available power, which is not efficient. Variable displacement systems are one method of improving the fuel efficiency of an internal combustion engine during the periods of operation where the full output of the engine is not required. Vibration and sound along with lagging performance are challenges associated with variable displacement systems that have to be minimized in order for a variable displacement system to be transparent to the user.

An engine controller and a control system for a variable displacement internal combustion engine configured to optimize the fuel efficiency while also being transparent to a user is desirable.

SUMMARY

According to one aspect, an engine controller for controlling an internal combustion engine operatively coupled to automatic transmission and having a plurality of cylinders. The engine controller is in signal communication with the internal combustion engine, the automatic transmission, and a displacement adjusting mechanism. The engine controller is configured to determine an operating condition of the internal combustion engine and to communicate to at least one of the automatic transmission to shift to one of a plurality of gear configurations, each of the plurality of gear configurations corresponding to a range of operating conditions of the internal combustion engine, and the displacement adjusting mechanism to one of activate and deactivate at least one cylinder of the plurality of cylinders. The engine controller determines that a shift from a first gear configuration of the plurality of gear configurations to a second gear configuration of the plurality of gear configurations requires a positive torque from the internal combustion engine when the at least one cylinder is deactivated. The engine controller also communicates with the displacement adjusting mechanism to activate the at least one deactivated cylinder such that the plurality of cylinders are activated before the shift from the first gear configuration to the second gear configuration and the positive torque are completed.

According to another aspect, a method for controlling an internal combustion engine having a plurality of cylinders is provided. The method includes controlling by an engine controller, an automatic transmission operatively coupled to the internal combustion engine to initiate a shift from a first gear configuration of a plurality of gear configurations to a second gear configuration of the plurality of gear configurations. Before the shift by the automatic transmission from the first gear configuration to the second gear configuration is completed, the method also includes controlling by the engine controller, the internal combustion engine to initiate production of a positive torque. Before the shift by the automatic transmission from the first gear configuration to the second gear configuration is completed and the internal combustion engine produces the positive torque, The method further includes controlling by the engine controller a displacement adjusting mechanism operatively coupled to the internal combustion engine to activate at least one deactivated cylinder of the plurality of cylinders. The method also includes shifting by the automatic transmission from the first gear configuration to the second gear configuration while the internal combustion engine produces the positive torque.

According to a further aspect, a control system for an internal combustion engine operatively coupled to an automatic transmission and including a plurality of cylinders. The control system includes an engine controller in signal communication with the internal combustion engine, the automatic transmission, and a displacement adjusting mechanism to one of activate and deactivate at least one cylinder of the plurality of cylinders. The engine controller configured to determine an operating condition of the internal combustion engine and communicate with at least one of the automatic transmission to shift to one of the plurality of gear configurations and the displacement adjusting mechanism to one of activate and deactivate the at least one cylinder. The engine controller determines that a shift from a first gear configuration of the plurality of gear configurations to a second gear configuration of the plurality of gear configurations requires a positive torque from the internal combustion engine when at least one of the plurality of cylinders are deactivated. The engine controller signals the displacement adjusting mechanism to activate the at least one deactivated cylinders such that the plurality of cylinders are activated before the shift from the first gear configuration to the second gear configuration and the positive torque are completed.

BRIEF DESCRIPTION OF THE DRAWINGS

FIG. 3 is a flow chart depicting another exemplary process for controlling a drive train of a vehicle.

Other aspects and advantages of certain embodiments will become apparent upon consideration of the following detailed description, wherein similar structures have similar reference numerals.

DETAILED DESCRIPTION

Figure 1:
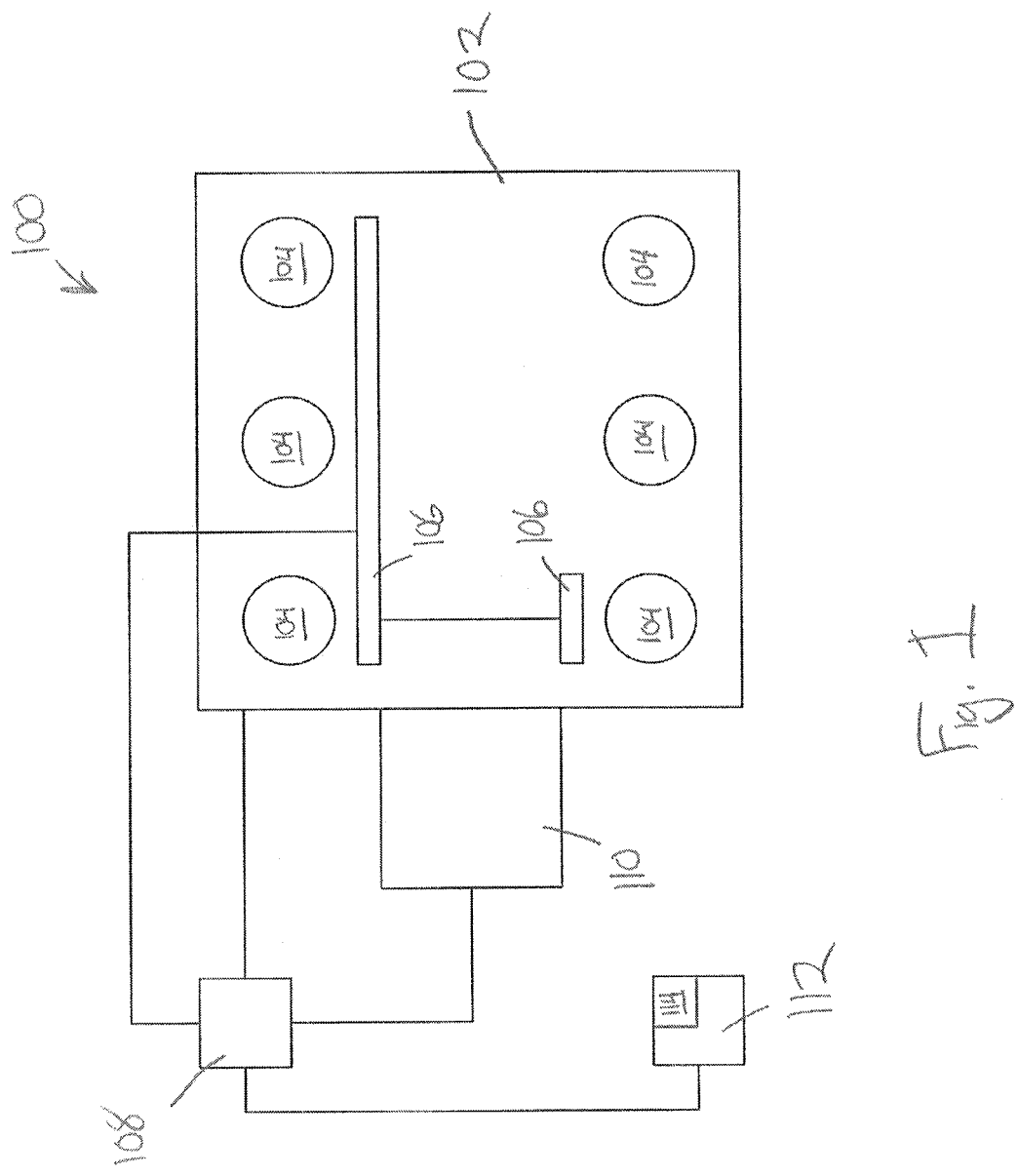
FIG. 1 is a schematic representation of a portion of an exemplary drive train of a vehicle.

Referring initially to FIG. 1, a schematic representation of a portion of an exemplary vehicle drive train 100 is shown. A variable displacement internal combustion engine 102 (here depicted having a V-6 configuration) includes a plurality of cylinders 104, a displacement adjustment mechanism 106, and an engine controller 108. An automatic transmission 110 is operatively coupled to the variable displacement internal combustion engine 102. The drive train 100 also may include a plurality of input devices 112 position throughout the vehicle but shown as a box for clarity. In the embodiment shown, the engine controller 108 is in signal communication with the variable displacement internal combustion engine 102, the displacement adjusting mechanism 106, the automatic transmission 110, and the plurality of input devices 112.

The engine controller 108, and any controller or device that may act/perform control functions disclosed herein, may include one or more processors, memory and/or one or more programmable hardware elements. As used herein, the term "controller" is intended to include any types of processors, CPUs, microcontrollers, digital signal processors, or other suitable devices capable of executing software instructions. Further, memory may include a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which configuration data and programs may be stored and/or data communications may be buffered. The term "memory" may also include other types of known or future developed memory or combinations thereof.

Still referring to FIG. 1, it is understood that one having ordinary skill in the art would comprehend all of the necessary and/or optional components for different configurations of vehicle drive trains that may include the shown portion of the vehicle drive train 100. It is contemplated that the various embodiments of the present disclosure may be utilized with many different configurations of drive trains and vehicles. It is also contemplated that the various embodiments are not limited to only vehicles that employ internal combustion engines, and instead may be applied to any vehicle or device that employs a variable displacement internal combustion engine.

It is also contemplated that the plurality of input devices 112 may include one or more suitable sensors 114. These sensors 114 may be placed in a variety of positions within a drive train including, without limitation, the variable displacement internal combustion engine 102 and the automatic transmission 110. In various embodiments, the sensors 114 may include, without limitation, one or more of the following: a throttle position sensor, an engine speed sensor, a wheel speed sensor, a steering wheel position sensor, an air-fuel ratio sensor and/or any suitable alternative or additional sensor known in the art. It is understood that the sensors 114 are well understood by one having ordinary skill in the art. It is also contemplated that the plurality of input devices 112 may include manual input devices operated by a user during the operation of a vehicle. The manual input devices may include paddles operatively connected to a steering wheel or column for the user to indicate a shift of the transmission 110 is desired. Also, a user may indicate via a traditional shift lever that a shift of the transmission 110 is desired. One having ordinary skill in the art would understand the manual shift functions of modern automatic transmissions that give users the ability to shift gears while operating a vehicle to simulate a manual transmission. In certain embodiments, the plurality of input devices 112 includes a cruise control system (not shown). It is also contemplated that the plurality of input devices 112 may include any type of switch, sensor, detector, and/or input device and/or interface, mechanical and/or electrical known to one having ordinary skill in the art that may be used to control and/or operate a vehicle employing a variable displacement internal combustion engine and an automatic transmission.

Still referring to FIG. 1, in one embodiment the displacement adjusting mechanism 106 is configured to adjust the displacement of the internal combustion engine 102 by deactivating and activating one or more cylinders 104. In some embodiments, the displacement adjusting mechanism 106 deactivates a bank of the cylinders 104 for the internal combustion engine 102 in a traditional "V" configuration. Alternatively, the internal combustion engine 102 has an in-line cylinder configuration (not shown) with adjacent or alternating cylinders 104 that are deactivated. It is contemplated that one having ordinary skill in the art would understand the different configurations of cylinder arrangements and that deactivating one or more cylinders 104 in different combinations may be beneficial to fuel consumption. It is also contemplated that deactivating one or more cylinders 104 with the displacement adjusting mechanism 106 may be referred to as activating or turning on a cylinder management (CM) system. Conversely, activating the one or more cylinders 104 by the displacement adjusting mechanism 106 may be referred to as deactivating or turning off the cylinder management (CM) system.

It is also contemplated that the deactivation of cylinders 104 in a variable displacement engine 102 may be accomplished by a variety of mechanical means. The displacement adjusting mechanism 106 may close the valves (not shown) utilizing an oil system that can be pressurized to control the valves (not shown) of the cylinders being deactivated. In some embodiments that include direct injection of the fuel into the cylinders 104, the displacement adjusting mechanism 106 may electrically or mechanically deactivate the injection of fuel into the cylinders 104. One having ordinary skill in the art would understand the different types of mechanical and electrical systems required and available to deactivate at least one cylinder 104 such that it is not producing torque or consuming fuel.

The different combinations of cylinders 104 to be activated and deactivated may be controlled by the engine controller 108. In one embodiment, the deactivation of one or more cylinders 104 is determined by the engine controller 108 depending, at least in part, on the torque requirements during an operating condition of the internal combustion engine 102. The operating condition may include any number of inputs and variables and is determined and monitored by the engine controller 108. If the engine controller 108 determines the current operating condition requires an amount of torque that may be produced by a configuration of cylinders 104 that is less than the maximum number of cylinders 104, the engine controller 108 may signal the displacement adjusting mechanism 106 to deactivate one or more cylinders 104 depending on the torque required. In some embodiments, the engine controller 108 may determine the necessary number of cylinders 104 based on a simple threshold value of torque as required by the determined operating condition of the internal combustion engine 102. For example, if the operating condition requires less torque than the threshold value of the current operating condition, the engine controller 108 may signal the displacement adjusting mechanism 106 to deactivate the one or more cylinders 104. At such time the operating condition changes as determined by the engine controller 108 (e.g., the user presses the gas pedal down, requesting more torque), the torque required may surpass the threshold and the engine controller 108 may signal the displacement adjusting mechanism 106 to activate the one or more cylinders 104. It is contemplated that different operating conditions may have different threshold values for torque for the engine controller 108 to determine if one or more cylinders 104 may be deactivated. It is contemplated that the operating condition determined by the engine controller 108 may include any number of factors, inputs, pre-programmed values, sensor signals, software routines and subroutines, or any other type of parameter, reading, or input that one have ordinary skill in the art would understand that an engine controller 108 may utilize when determining and/or changing the operating condition of a vehicle and/or an internal combustion engine. Some non-limiting examples are the speed of the vehicle, the speed of the engine and the transmission, the temperature of the engine, engine coolant, and ambient air, the position of the gas pedal operated by a user, the gear configuration selected by a user, the settings and status of a cruise control system, the amount of torque required, a threshold speed value for activating cylinder management, the air-fuel ratio, and the number of activated or deactivated cylinders and any suitable combination thereof.

It is also contemplated that the torque output of the variable displacement internal combustion engine may not be a perfect square wave function and that there may be variable lead-in functions as the torque changes during different operating conditions. One having ordinary skill in the art would understand there are many different ways by which the engine controller 108 determines the operating condition of the internal combustion engine 102 based on the input from the plurality of input devices 112 and controls the displacement adjusting mechanism 106 for varying levels and thresholds of torque.

Still referring to FIG. 1, in one embodiment the automatic transmission 110 is coupled to the internal combustion engine 102 by one or more friction clutches (not shown) that allow slippage. The automatic transmission 110 is configured to engage a plurality of gear configurations and shift between the plurality of gear configurations when signaled by the engine controller 108. In certain embodiments, the automatic transmission 110 includes internal friction clutches (not shown) that allow slippage to accomplish shifting between the plurality of gear configurations. In other embodiments, the automatic transmission 110 includes positive alignment clutches or dog clutches (not shown), that do not allow slippage, for engaging one or more of the plurality of gear configurations. Moreover, the automatic transmission 110 may include a combination of friction clutches and dog clutches. When engaging dog clutches, shifting from a first gear configuration to a second gear configuration requires positive alignment and no slippage is allowed. By utilizing a clutch slip during shifting between the plurality of gear configurations vibrations from the internal combustion engine 102 may be dampened or eliminated. Automatic transmissions that include dog clutches can not rely on clutch slippage to dampen internal combustion engine vibrations when the dog clutches are engaged to shift between the plurality of gear configurations.

In certain embodiments, a combination of friction clutches and dog clutches are engaged when shifting between the first gear configuration and the second gear configuration. In one embodiment, the automatic transmission 110 is a 9-speed automatic transmission. The 9-speed automatic transmission 110 includes a combination of friction clutches and dog clutches. More specifically, one or more dog clutches may be engaged when the automatic transmission 110 shifts up or down between a fourth gear and a fifth gear and between a seventh gear and an eighth gear.

Figure 2:
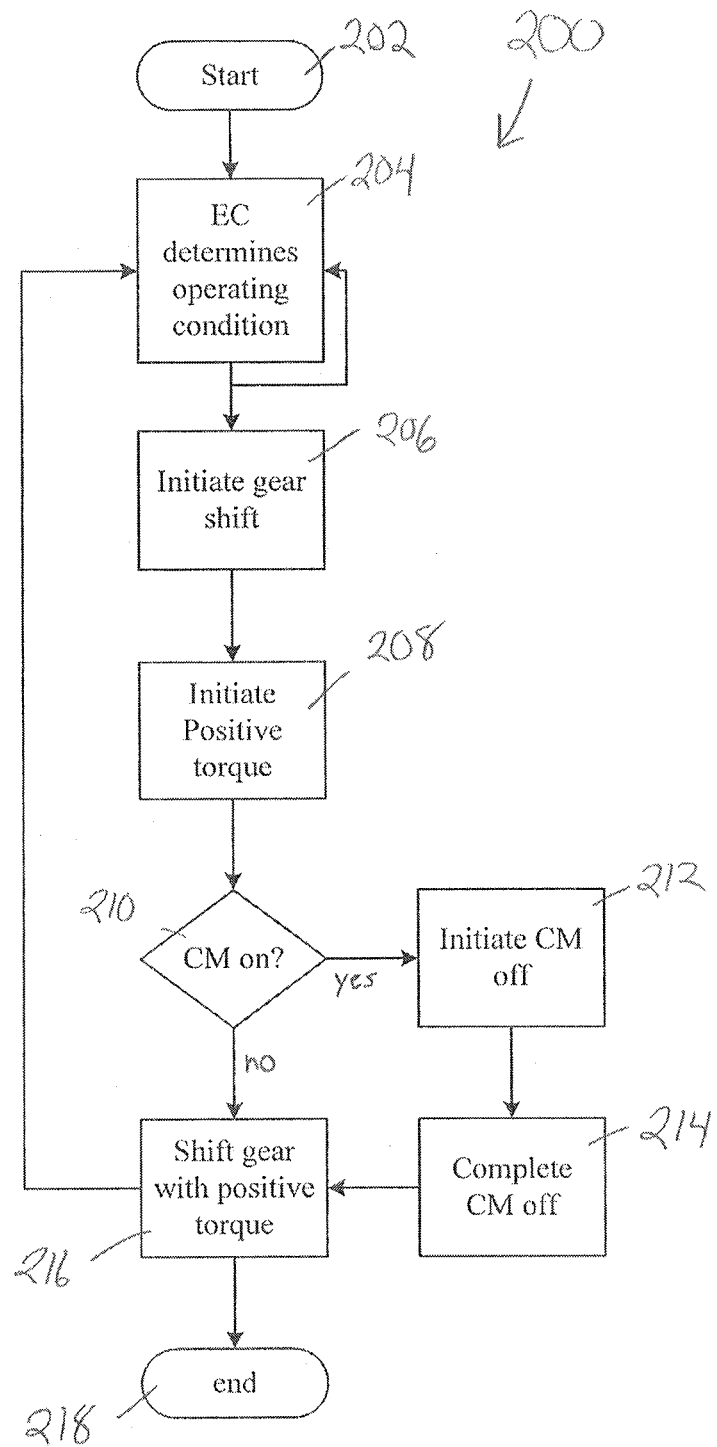
FIG. 2 is a flow chart depicting an exemplary process for controlling a drive train of a vehicle.

Now referring to FIG. 2, a flowchart depicting an exemplary method 200 of controlling the internal combustion engine 102 is provided. In the embodiment shown, the method 200 begins when the user starts operating a vehicle equipped with the vehicle drive train 100 represented by the start block 202. At block 204, the engine controller 108 determines at least one vehicle operating condition. In certain embodiments, the engine controller 108 determines the operating condition repeatedly and/or continuously based on a time dependent value (e.g.; a clock speed of a processor in the engine controller 108 or a timer built into the engine controller 108). In other embodiments, the engine controller 108 may only determine a new operating condition when a change in inputs from the plurality of input devices 112 is detected. In certain embodiments, the engine controller 108 may only determine a new operating condition when one of the plurality of input devices 112 signals the engine controller 108. When the engine controller 108 determines that the operating condition requires a shift from a first gear configuration to a second gear configuration by the automatic transmission 110 and that the shift requires a positive torque output from the internal combustion engine 102 while the cylinder management (CM) system is on, the engine controller 108 proceeds to block 206. At block 206, the engine controller 108 transmits a signal to the automatic transmission 110 to initiate a shift from the first gear configuration to the second gear configuration. Before the shift can be completed, the method proceeds to block 208, and the engine controller 108 transmits a signal to the internal combustion engine 102 to initiate a positive torque output.

In certain embodiments, the exemplary method 200 may be used only when shifting between the first gear configuration and the second gear configuration and includes engaging at least one dog clutch within the automatic transmission 110. In some embodiments, the method 200 may only be used when shifting between the first gear configuration and the second gear configuration and includes engaging at least one dog clutch within the automatic transmission 110, wherein the first gear configuration has a higher gear ratio than the gear ratio of the second gear configuration. In certain embodiments, the automatic transmission 110 is a 9-speed transmission that includes a combination of friction clutches and dog clutches. The 9-speed automatic transmission 110 may engage at least one dog clutch when shifting up or down between a fourth gear and a fifth gear and between a seventh gear and an eighth gear, for example. In a particular embodiment, the method 200 may only be used when the 9-speed automatic transmission 110 shifts from a first gear configuration to a second gear configuration and the first and second gear configurations are one of the pairs of the fifth and fourth gears and the eighth and seventh gears.

Block 210 is a decision block used to illustrate an alternative embodiment. The status of the cylinder management (CM) system is known by the engine controller 108 at all times. When the CM system is on, i.e., one or more cylinders 104 are deactivated, the engine controller 108 proceeds to block 212 and transmits a signal to the displacement adjusting mechanism 106 to deactivate or turn off the CM system. The displacement adjusting mechanism 106 deactivates the CM system at block 212 before the shift in gears and the positive torque output are completed. At block 214, the deactivation of the CM system is completed. At block 216, the shift command is completed by the automatic transmission 110 and the positive torque command is completed by the internal combustion engine 102 with all of the cylinders 104 activated. Alternatively, if the engine controller 108 determines a gear shift and a positive torque output is required by a new operating condition and the CM system is off, the method 200 continues from block 204 to block 208. After completing block 208, the method 200 proceeds directly to block 216 and the shift and positive torque output are completed. Then the engine controller 108 determines the operating condition at block 204 until the next time a shift is required or the vehicle is shut down by the user at block 218.

It is contemplated that producing a positive torque may be beneficial during a shift between a first gear configuration to a second gear configuration as a means to match a speed of the internal combustion engine 102 to a speed of the automatic transmission 110. This in turn may reduce the required slippage of any clutches and facilitate completion of the shift. However, producing a positive torque while one or more cylinders 104 are deactivated by the displacement adjusting mechanism 106 may cause the torque threshold of any particular operating condition to be exceeded. In embodiments where the amount of allowed slippage is reduced or no slippage is allowed, e.g., when dog clutches are used, producing a positive torque while shifting with the CM system on may allow for undesirable vibrations to be passed from the internal combustion engine 102 through the automatic transmission 110 to be observed by the user. Because such condition is undesirable, the method 200 may be implemented to prevent the user from detecting any vibration relating to CM system during gear shifts requiring positive torque outputs.

Now referring to FIG. 3, a flowchart depicting an exemplary alternative method 300 of controlling the internal combustion engine 102 is provided. Like method 200, the method 300 begins when the user starts operating a vehicle equipped with a vehicle drive train 100 represented by the start block 302. At block 304, the engine controller 108 determines the operating condition of the vehicle. However, regardless of the operating condition determined by the engine controller 108, the user may signal a gear shift with a suitable input device, such as a manual input device as described above. At block 306, a user signals for the gear shift independent of the operating condition determined by the engine controller 108. At block 308, the engine controller 108 transmits a signal to the automatic transmission 110 to initiate a shift from the first gear configuration to the second gear configuration. Before the shift can be completed, the method 300 proceeds to block 310, and the engine controller 108 transmits a signal to the internal combustion engine 102 to initiate a positive torque output. The engine controller 108 determines whether the CM system is activated and, if the CM system is activated, the engine controller 108 initiates the deactivation of the CM system at block 314 and completes the deactivation of the CM system at block 315. Next, the method 300 proceeds to block 318 and the shift is completed while the positive torque is produced. In one embodiment, the engine controller 108 then continues to determine the operating condition at block 304 until the next time a shift is required or the vehicle is shut down by the user at block 320. When the CM system is deactivated, the method 300 proceeds from block 310 directly to block 318.

In some embodiments, the method 200 or the method 300 runs when a shift between the plurality of gear configurations is necessary and a positive torque is required when the CM system has deactivated at least one cylinder of the plurality of cylinders 104. It is contemplated that the engine controller may run other methods when a shift between the plurality of gear configurations is necessary and a positive torque is not required when the CM system has deactivated at least one cylinder of the plurality of cylinders 104. It is also contemplated that other methods may be run by the controller when a shift between the plurality of gear configurations is necessary and a positive torque is required and the plurality of cylinders are activated. In certain embodiments, the method 200 and the method 300 may run when a shift between the plurality of gear configurations is necessary independent of any torque requirement and/or if at least one of the plurality of cylinders 104 is deactivated.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:

1. An engine controller for controlling an internal combustion engine, the internal combustion engine operatively coupled to an automatic transmission and including a plurality of cylinders, the engine controller in signal communication with the internal combustion engine, the automatic transmission, and a displacement adjusting mechanism, the engine controller configured to:
   determine an operating condition of the internal combustion engine; and
   communicate to at least one of the automatic transmission to shift to one of a plurality of gear configurations, each of the plurality of gear configurations corresponding to a range of operating conditions of the internal combustion engine, and the displacement adjusting mechanism to one of activate and deactivate at least one cylinder of the plurality of cylinders,
   wherein the engine controller determines that a shift from a first gear configuration of the plurality of gear configurations to a second gear configuration of the plurality of gear configurations requires a positive torque from the internal combustion engine when the at least one cylinder is deactivated, and the engine controller communicates with the displacement adjusting mechanism to activate the at least one deactivated cylinder such that the plurality of cylinders are activated before the shift from the first gear configuration to the second gear configuration and the positive torque are completed.

2. The engine controller of claim 1, further comprising a plurality of input devices operatively coupled to the internal combustion engine and in signal communication with a processor of the engine controller.

3. The engine controller of claim 2, wherein the processor is configured to determine the operating condition of the internal combustion engine based, at least in part, on signals received by the processor from one or more of the plurality of input devices.

4. The engine controller of claim 2, wherein the plurality of input devices includes a user actuated shift device.

5. The engine controller of claim 4, wherein the processor is configured to initiate a shift of the automatic transmission to one of the plurality of gear configurations based on actuation of the user actuated shift device by a user.

6. The engine controller of claim 5, wherein the engine controller determines the operating condition of the internal combustion engine and that the shift to one of the plurality of gear configurations requires a positive torque from the internal combustion engine when the at least one cylinder is deactivated.

7. The engine controller of claim 6, wherein the engine controller communicates with the displacement adjusting mechanism to activate the at least one deactivated cylinder such that the plurality of cylinders are activated before the shift from the first gear configuration to the second gear configuration and the positive torque are completed.

8. The engine controller of claim 4, wherein the automatic transmission is a 9-speed automatic transmission and at least one dog clutch is engaged when shifting between a fourth gear and a fifth gear and between a seventh gear and an eighth gear, and the first gear configuration and the second gear configuration are one of the fifth gear and the fourth gear and the eighth gear and the seventh gear.

9. A method of controlling an internal combustion engine including a plurality of cylinders, the method comprising:
   controlling by an engine controller, an automatic transmission operatively coupled to the internal combustion engine to initiate a shift from a first gear configuration of a plurality of gear configurations to a second gear configuration of the plurality of gear configurations;
   before the shift by the automatic transmission from the first gear configuration to the second gear configuration is completed, controlling by the engine controller the internal combustion engine to initiate production of a positive torque;
   before the shift by the automatic transmission from the first gear configuration to the second gear configuration is completed and the internal combustion engine produces the positive torque, controlling by the engine controller a displacement adjusting mechanism operatively coupled to the internal combustion engine to activate at least one deactivated cylinder of the plurality of cylinders; and
   shifting by the automatic transmission from the first gear configuration to the second gear configuration while the internal combustion engine produces the positive torque.

10. The method of claim 9, wherein the engine controller is in signal communication with the internal combustion engine, the automatic transmission, the displacement adjusting mechanism, and a plurality of input devices operatively coupled to the internal combustion engine, the method further comprising:
   determining by the engine controller an operating condition of the internal combustion engine based, at least in part, on at least one signal received from one or more of the plurality of input devices;
   transmitting by the engine controller a signal to the automatic transmission to initiate the shift from the first gear configuration to the second gear configuration; and
   transmitting by the engine controller a signal to the internal combustion engine to initiate the production of the positive torque.

11. The method of claim 10, wherein controlling by the engine controller a displacement adjusting mechanism operatively coupled to the internal combustion engine to activate at least one deactivated cylinder of the plurality of cylinders comprises transmitting by the engine controller a signal to the displacement adjusting mechanism to activate the at least one deactivated cylinder.

12. The method of claim 9, further comprising:
   receiving by the engine controller at least one signal from at least one of a plurality of input devices operatively coupled to the internal combustion engine;
   determining by the engine controller an operating condition of the internal combustion engine; and,
   when the operating condition includes the at least one deactivated cylinder, determining by the engine controller from the operating condition that the shift from the first gear configuration to the second gear configuration is required and a positive torque is required from the internal combustion engine.

13. The method of claim 12, further comprising:
   sending a signal by the engine controller to the automatic transmission to shift from the first gear configuration to the second gear configuration; and
   sending a signal by the engine controller, before the completion of the shift from the first gear configuration to the second gear configuration by the automatic transmission, to the internal combustion engine to produce a positive torque.

14. The method of claim 13, further comprising sending a signal by the engine controller, before the internal combustion engine produces the positive torque, to the displacement adjusting mechanism to activate the at least one deactivated cylinder before the shift from the first gear configuration to the second gear configuration by the automatic transmission is completed and the internal combustion engine produces the positive torque.

15. A control system for an internal combustion engine, the internal combustion engine including a plurality of cylinders and being operatively coupled to an automatic transmission comprising a plurality of gear configurations, the control system comprising:
   an engine controller in signal communication with the internal combustion engine, the automatic transmission, and a displacement adjusting mechanism to one of activate and deactivate at least one cylinder of the plurality of cylinders, the engine controller configured to:
   determine an operating condition of the internal combustion engine; and
   communicate with at least one of the automatic transmission to shift to one of the plurality of gear configurations and the displacement adjusting mechanism to one of activate and deactivate the at least one cylinder,
   wherein the engine controller determines that a shift from a first gear configuration of the plurality of gear configurations to a second gear configuration of the plurality of gear configurations requires a positive torque from the internal combustion engine when at least one of the plurality of cylinders are deactivated, the engine controller signals the displacement adjusting mechanism to activate the at least one deactivated cylinder such that the plurality of cylinders are activated before the shift from the first gear configuration to the second gear configuration and the positive torque are completed.

16. The control system of claim 15, further comprising a plurality of input devices operatively coupled to the internal combustion engine and in signal communication with the engine controller, wherein the operating condition of the internal combustion engine is based, at least in part, on signals received by the engine controller from one or more of the plurality of input devices.

17. The control system of claim 16, wherein the plurality of input devices includes a user actuated shift device.

18. The control system of claim 17, wherein the engine controller is configured to initiate a shift of the automatic transmission to one of the plurality of gear configurations based on actuation of the user actuated shift device by a user.

19. The control system of claim 18, wherein the engine controller determines the operating condition of the internal combustion engine and that the shift to one of the plurality of gear configurations requires a positive torque from the internal combustion engine when the at least one cylinder is deactivated.

20. The control system of claim 19, wherein the engine controller communicates with the displacement adjusting mechanism to activate the at least one deactivated cylinder such that the plurality of cylinders are activated before the shift from the first gear configuration to the second gear configuration and the positive torque are completed.

* * * * *